(12) United States Patent
Clingman et al.

(10) Patent No.: US 10,374,481 B2
(45) Date of Patent: Aug. 6, 2019

(54) MOTOR BEARING WITH ROTOR CENTRALIZATION

(71) Applicants: James C. Clingman, Broken Arrow, OK (US); Michael A. Forsberg, Claremore, OK (US)

(72) Inventors: James C. Clingman, Broken Arrow, OK (US); Michael A. Forsberg, Claremore, OK (US)

(73) Assignee: Baker Hughes Incorporated, Houston, TX (US)

( * ) Notice: Subject to any disclaimer, the term of this patent is extended or adjusted under 35 U.S.C. 154(b) by 482 days.

(21) Appl. No.: 15/281,307

(22) Filed: Sep. 30, 2016

(65) Prior Publication Data

US 2017/0098974 A1 Apr. 6, 2017

Related U.S. Application Data

(60) Provisional application No. 62/235,655, filed on Oct. 1, 2015.

(51) Int. Cl.
*H02K 5/167* (2006.01)
*H02K 7/08* (2006.01)
*H02K 5/16* (2006.01)
*H02K 7/00* (2006.01)

(52) U.S. Cl.
CPC ....... *H02K 5/1672* (2013.01); *H02K 2207/03* (2013.01)

(58) Field of Classification Search
CPC H02K 5/12; H02K 5/132; H02K 5/24; H02K 5/1672; H02K 5/16; H02K 5/161; H02K 7/08; H02K 7/083
See application file for complete search history.

(56) References Cited

U.S. PATENT DOCUMENTS

| | | | | |
|---|---|---|---|---|
| 5,189,328 A | * | 2/1993 | Knox | F04D 13/06 310/87 |
| 6,091,175 A | * | 7/2000 | Kinsinger | F16C 27/063 277/438 |
| 6,424,066 B1 | * | 7/2002 | Watson | F04D 29/047 175/92 |

(Continued)

FOREIGN PATENT DOCUMENTS

RU 2380810 12/2008

*Primary Examiner* — Edgardo San Martin
(74) *Attorney, Agent, or Firm* — Sprinkle IP Law Group

(57) ABSTRACT

Systems and methods for reducing vibration in an electric motor using rotor bearing assemblies that are positioned within a bore of the stator to support the motor's shaft and rotor sections so that they can rotate within the stator bore. Each rotor bearing assembly includes an outer bearing and an inner bearing sleeve that rotates within the bearing. The bearing is secured so that its rotation within the stator is inhibited, but it can move axially. Each end of the bearing sleeve has a conically tapered contact surface which contacts and secures the corresponding rotor section and centers the rotor section with respect to the axis of rotation of the bearing. The contact surfaces of the rotor sections may be chamfered at an angle complementary to the tapered contact surface of the bearing sleeve to distribute the contact pressure between them over a greater contact surface area.

15 Claims, 2 Drawing Sheets

(56) References Cited

U.S. PATENT DOCUMENTS

| | | | |
|---|---|---|---|
| 8,400,035 B2 * | 3/2013 | Watson | F04D 13/10 |
| | | | 310/90 |
| 8,567,042 B2 * | 10/2013 | Neuroth | F16C 17/04 |
| | | | 29/596 |
| 8,616,863 B2 * | 12/2013 | Forsberg | F04D 1/06 |
| | | | 417/423.13 |
| 9,127,683 B2 * | 9/2015 | Knapp | F04D 13/10 |
| 9,356,487 B2 * | 5/2016 | Watson | F04D 13/10 |
| 9,397,547 B2 * | 7/2016 | Neuroth | F16C 17/04 |
| 9,624,938 B2 * | 4/2017 | Forsberg | F04D 13/10 |
| 9,941,770 B2 * | 4/2018 | Rumbaugh | H02K 7/08 |
| 9,951,810 B2 * | 4/2018 | Parmeter | F16C 19/38 |
| 2014/0232226 A1 * | 8/2014 | Lantto | H02K 7/08 |
| | | | 310/90.5 |
| 2017/0204904 A1 * | 7/2017 | Parmeter | F16C 19/38 |
| 2017/0264161 A1 * | 9/2017 | Forsberg | E21B 4/003 |

* cited by examiner

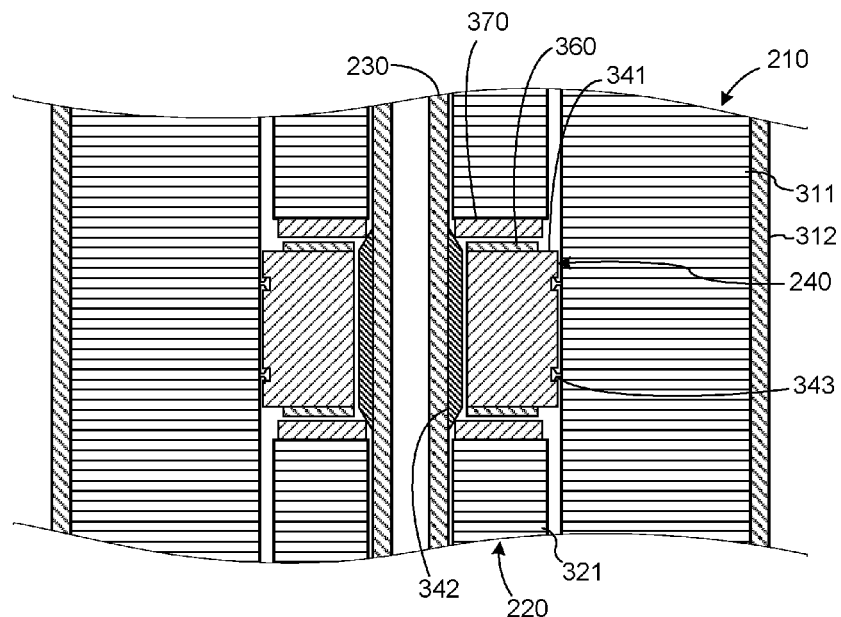
Fig. 3
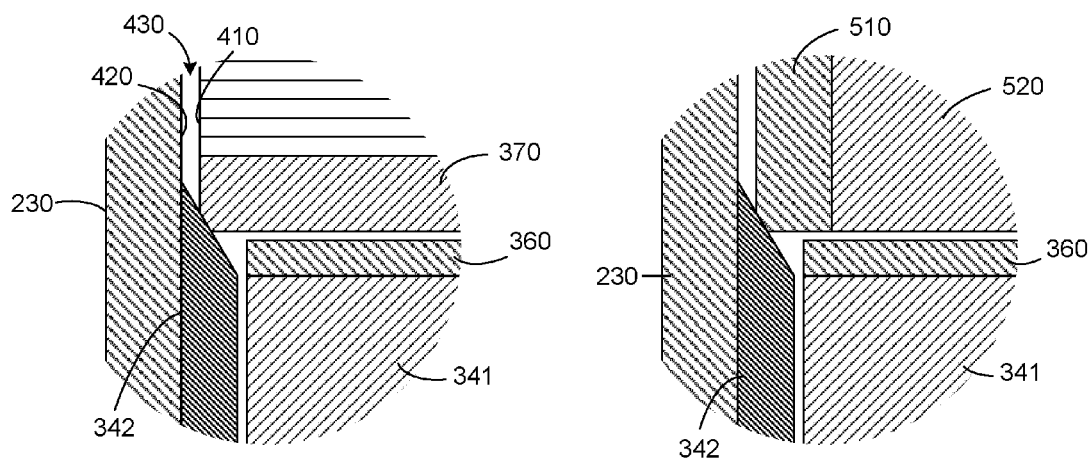
Fig. 4
Fig. 5

MOTOR BEARING WITH ROTOR CENTRALIZATION

CROSS-REFERENCE TO RELATED APPLICATIONS

This application claims the benefit of U.S. Provisional Patent Application 62/235,655, filed Oct. 1, 2015 by James C. Clingman, et al., which is incorporated by reference as if set forth herein in its entirety.

BACKGROUND

Field of the Invention

The invention relates generally to electric motor construction, and more particularly to motors in which a tapered bearing sleeve is used to centralize a rotor with respect to the axis of rotation of a rotor bearing assembly and motor shaft.

Related Art

Oil and natural gas are often produced by drilling wells into oil reservoirs and then pumping the oil and gas out of the reservoirs through the wells. If there is insufficient pressure in the well to force these fluids out of the well, it may be necessary to use an artificial lift system in order to extract the fluids from the reservoirs. A typical artificial lift system employs an electric submersible pump (ESP) which is positioned in a producing zone of the well to pump the fluids out of the well.

An ESP system includes a pump and a motor which is coupled to the pump and drives the pump. The ESP system may also include seals, gauge packages and other components. Because they are designed to fit within the borehole of a well, ESP systems are typically less than ten inches wide, but may be tens of meters long. The motor of an ESP system may produce hundreds of horsepower.

The motor of the ESP system is typically an AC induction motor. The motor has a stator that is cylindrical with a coaxial bore. A cylindrical rotor is coaxially positioned within the bore of the stator. The rotor is coupled to a shaft so that rotation of the rotor turns the shaft. Rotor bearing assemblies hold the rotor in position within the bore of the stator and allow the rotor to rotate smoothly within the bore.

Conventionally, the rotor has a coaxial bore which extends through it. The rotor is installed on the shaft so that the shaft extends through the bore. There is normally a gap between the rotor and the shaft. This gap allows the rotor to move axially on the shaft. This is necessary to allow the rotor to be installed on the shaft, and to allow the rotor to move on the shaft as the motor expands and contracts with changes in temperature.

While the gap is necessary for the construction and proper operation of the motor, it can also cause some problems. More specifically, the gap may allow the rotor to move laterally (perpendicular to the axis of the motor. Consequently, the rotor may not rotate smoothly with respect to the axis of rotation, but may instead orbit the axis. In other words, the axis of the rotor may be offset from the axis of rotation. This may cause vibration and excessive wear that may shorten the life of the motor.

It would therefore be desirable to provide means to maintain the coaxial positioning of the rotor with respect to the rotor bearing assemblies and the axis of rotation, thereby reducing vibrations in the motor.

SUMMARY OF THE INVENTION

This disclosure is directed to systems and methods for reducing vibration in an electric motor. The present systems and methods are well suited for use in elongated ESP motors in which multiple rotor sections are mounted on a motor shaft, and rotor bearing assemblies between each rotor section support the rotor within the motor's stator bore. The rotor bearing assemblies have bearing sleeves which are tapered at their ends. The ends of the rotor sections engage the tapered ends of the bearing sleeves, thereby centralizing the rotor sections with respect to the rotor bearing assemblies. This maintains the coaxial positioning of the rotor to the axis of rotation and reduces vibration in the motor. Numerous embodiments are possible.

One embodiment comprises a motor that has a stator and one or more rotor sections that are mounted on a shaft and positioned within a bore of the stator. A set of rotor bearing assemblies are positioned within the stator bore to support the shaft and rotor sections so that they can rotate within the stator bore. Each rotor bearing assembly includes an outer bearing and an inner bearing sleeve that rotates within the bearing. The bearing is secured to the stator (e.g., by an interference fitting) and the bearing sleeve is secured to the shaft and the rotor sections. Each end of the bearing sleeve has a conically tapered contact surface which contacts and secures the corresponding rotor section and centers the rotor section with respect to the axis of rotation of the bearing. The conically tapered contact surfaces may, for example, face outward from the axis of rotation. The rotor sections have a rotor bore that extends through them, and the shaft is positioned in the rotor bore. The conically tapered contact surfaces of the bearing sleeves contact corresponding contact surfaces of the rotor sections and maintain an annular gap between the rotor sections and the shaft. The bearing assemblies and rotor sections in one embodiment are axially movable with respect to the shaft and the stator bore, but maintain the centered positions of the rotor sections with respect to the axis of rotation. The contact surfaces of the rotor sections may be chamfered at an angle which is complementary to the tapered contact surface of the bearing sleeve, so that the contact pressure between them is distributed over a greater contact surface on the rotor sections.

Another embodiment comprises a method for maintaining a position of a rotor section in an electric motor. This method includes providing a stator that has a bore through it, where rotor sections are positioned within the stator bore and a shaft is positioned in a bore through the rotor sections. A set of rotor bearing assemblies are positioned in the stator bore with corresponding bearing portions secured to the stator and corresponding bearing sleeves secured to the rotor sections and to the shaft. The bearings may be secured to the stator by providing interference fittings between the bearings and the stator, thereby inhibiting rotation of the bearing within the stator, but allowing the bearing to move axially. The ends of the bearing sleeve have conically tapered contact surfaces that contact the corresponding rotor sections and center the rotor sections with respect to an axis of rotation of the bearing assemblies. An annular gap may be maintained between the rotor sections and the shaft. The rotor sections and rotor bearing assemblies may move axially with respect to the shaft in response to the expansion and contraction of the shaft with respect to the rotor sections and rotor bearing assemblies.

Yet another embodiment comprises a rotor bearing assembly for a motor. The rotor bearing assembly includes an outer bearing portion and a bearing sleeve that rotates within the bearing. The bearing is configured to be secured within a bore of a stator. The bearing sleeve is configured to be secured (e.g., closely fitted to) a motor shaft and to one or more rotor sections positioned around the shaft. The ends of the bearing sleeve have conically tapered contact surfaces, so that when rotor sections contact the conically tapered contact surfaces, the rotor sections are centered with respect to an axis of rotation of the rotor bearing assembly.

BRIEF DESCRIPTION OF THE DRAWINGS

Other objects and advantages of the invention may become apparent upon reading the following detailed description and upon reference to the accompanying drawings.

FIG. 3 is a more detailed diagram illustrating the structure of an exemplary motor suitable for use in an ESP system.

FIG. 4 is a diagram illustrating the interface between an end ring of a rotor and a bearing sleeve in accordance with one embodiment.

FIG. 5 is a diagram illustrating the interface between a central tube of a rotor and a bearing sleeve in accordance with an alternative embodiment.

Figure 1:
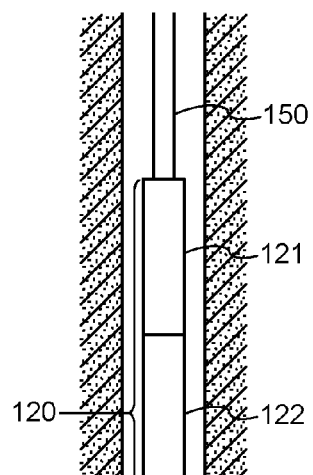
FIG. 1 is a diagram illustrating some of the primary components of an electric submersible pump system.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention. Further, the drawings may not be to scale, and may exaggerate one or more components in order to facilitate an understanding of the various features described herein.

DESCRIPTION OF EXEMPLARY EMBODIMENTS

Various embodiments of the invention are described below. It should be noted that these and any other embodiments described below are exemplary and are intended to be illustrative of the invention rather than limiting.

As described herein, various embodiments of the invention comprise systems and methods for reducing vibration in an electric motor for use in downhole equipment such as ESP's. In these embodiments, the rotor bearing assemblies that hold the shaft and rotor in position within the stator have bearing sleeves that are tapered at their ends. The tapered ends of the bearing sleeves centralize the end rings and consequently the rotor sections with respect to the rotor bearing assemblies. This maintains the coaxial positioning of the rotor to the axis of rotation and reduces vibration.

Embodiments of the invention may be implemented, for example, in ESP systems. Referring to FIG. 1, a diagram illustrating the components of an ESP system in one embodiment. In this embodiment, an ESP system is implemented in a well for producing oil, gas or other fluids. An ESP system 120 is coupled to the end of tubing string 150, and the ESP system and tubing string are lowered into the wellbore to position the pump in a producing portion of the well. A drive system (not shown) at the surface of the well provides power to the ESP system 120 to drive the system's motor.

ESP system 120 includes a pump section 121, a seal section 122, and a motor section 123. ESP system 120 may include various other components which will not be described in detail here because they are well known in the art and are not important to a discussion of the invention. Motor section 123 is coupled by a shaft through seal section 122 to pump section 121. Motor section 123 rotates the shaft, thereby driving pump section 121, which pumps the oil or other fluid through the tubing string 150 and out of the well.

Figure 2:
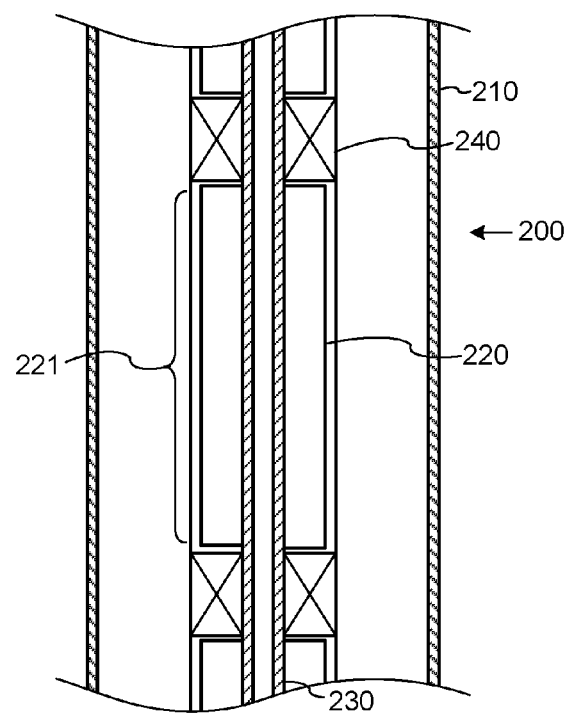
FIG. 2 is a diagram illustrating the structure of an exemplary motor suitable for use in an ESP system.

Referring to FIG. 2, a diagram illustrating the structure of an exemplary motor suitable for use in an ESP system is shown. As depicted in this figure, motor 200 has a stator 210 and a rotor 220. Stator 210 is generally cylindrical, with a coaxial bore that runs through it. Rotor 220 is positioned within the bore of stator 210. Rotor 220 is attached to a shaft 230. In this example, rotor 220 includes multiple rotor sections (e.g., 221), where rotor bearing assemblies (e.g., 240) are positioned at the ends of each rotor section. The rotor bearing assemblies 240 support shaft 230, and consequently rotor 220, within the stator bore 210 and allow the rotor and shaft 230 to rotate within the stator.

Referring to FIG. 3, a diagram illustrating the structure of motor 200 in more detail is shown. It can be seen in this figure that stator 210 is formed by stacking a set of thin, substantially identical plates or laminations (e.g., 311). The laminations 311 are generally annular in shape, so that when they are stacked together, they form a generally cylindrical shape, with a coaxial, cylindrical bore in the center. The diameter of the bore of the stator 210 may be referred to herein as the inner diameter of the stator. The stacked laminations 311 are pressed into a housing 312 to form the stator assembly 210. It should be noted that the laminations 311 need not be exactly identical. Similarly, the laminations 311 need not be perfectly annular (for example, the laminations may form a key or keyway that mates with a corresponding structure of housing 312 to prevent the stacked laminations from rotating within the housing).

The construction of rotor 220 is similar to that of stator 210, in that the rotor sections are formed by stacking corresponding sets of laminations (e.g., 321). The laminations 321 are again essentially annular, having an outer diameter that is slightly less than the inner diameter of stator 220, and an inner diameter that is slightly larger than the outer diameter of shaft 230. Each set of laminations 321 is stacked and shaft 230 is positioned through the bore formed through the stacked rotor laminations. End rings (e.g., 370) are positioned at each end of a rotor section's lamination stack.

Rotor 220 is held in position within stator 210 by the rotor bearing assemblies (e.g., 240). As noted above, there are multiple rotor bearing assemblies, each of which is positioned at the end of one or more rotor sections. The rotor bearing assemblies use means such as elastomeric T-rings (e.g., 343) to hold them in position within stator 210. The T-rings are positioned in grooves in the outer periphery of rotor bearing assembly 240 to provide an interference fit between the rotor bearing assemblies and the stator. The T-rings and similar structures may therefore be referred to herein as interference fittings. The T-rings hold the rotor bearing assemblies within the stator and prevent rotation of the outer portion of the rotor bearing assemblies (referred to as the bearings) in the stator, but allow the rotor bearing assemblies to move axially within the stator to accommodate expansion and contraction of the motor with temperature changes. O-rings, springs or other devices can be used in alternative embodiments to maintain the positions of the rotor bearing assemblies within the stator. Antirotation keys can also be used to prevent rotation of the bearings in the stator, but they do not center the rotor bearing assemblies in the stator bore.

Each rotor bearing assembly in this embodiment has a bearing 341 that is positioned on a bearing sleeve 342. As noted above, the rotor bearing assembly is held in position by T-rings or the like positioned at the outer diameter of the bearing. Bearing sleeve 342 fits very closely against shaft 230 and rotates with the shaft. Bearing sleeve 342 fits more closely against the shaft than would be possible or feasible between the rotor sections and the shaft. Bearing sleeve 342 rotates within bearing 341, thereby allowing shaft 230 to rotate freely within stator 230. Thrust washers (e.g., 360) are positioned between bearing 341 and the end rings (e.g., 370) of the rotor sections. Oil in the motor provides lubrication between bearing 341 and bearing sleeve 342, as well as between thrust washers 360 and end rings 370.

Referring to FIG. 4, the interface between end ring 370 and bearing sleeve 342 is shown in more detail. In this figure, it can be seen that end ring 370 does not have a sharp corner. Instead, the portion of end ring 370 adjacent to the tapered end of bearing sleeve 342 is chamfered. The chamfer is at the same angle as the taper at the end of bearing sleeve 342. The chamfering of the end ring provides a greater contact area between the end ring and the bearing sleeve is so that the contact pressure between them is distributed for more of a positive interface.

As noted above, it is typically necessary to make the inner diameter 410 of the rotor section larger than the outer diameter 420 of the shaft in order to be able to install the rotor section on the shaft. There is therefore an annular gap 430 between the rotor section and shaft. If the rotor section is not secured, this gap will allow the rotor to move laterally with respect to the shaft (i.e., generally perpendicular to the axis of rotation of the shaft) so that the rotor section is not coaxial with the axis of rotation. If the rotor section is not coaxial with the axis of rotation, the rotor section can generate a rotating force as it rotates. This force can cause excessive vibration and may limit the speed at which the motor can be operated. The vibration can also shorten the lifetime of the motor.

Although a single rotor section could be held in place by securing collets to the shaft at each end of the rotor section, this is not an optimal solution. In an ESP motor in which multiple rotor sections (in some cases 20 or more) are installed on the motor shaft, this can be problematic because it aligns the rotor sections to the shaft, but not necessarily to the axis of rotation. Additionally, as explained above, temperature changes cause the motor to expand and contract. Because the rotor sections and the shaft may expand and contract at different rates, it is necessary for the rotor sections to be able to move axially on the shaft as the components expand and contract. The collets may prevent this axial movement of the rotor sections with respect to the shaft. In the present systems and methods, although the bearing sleeve is closely fitted to the shaft, it can still move axially on the shaft to accommodate the different rates of expansion and contraction of the rotor and shaft. The rotor sections are compressed and are thereby held against the tapered ends of the bearing sleeves, but the rotor sections do not necessarily touch the shaft themselves other than as necessary for torque transfer. In fact, the inner diameter of the rotor sections may be increased in comparison to conventional rotor sections to ensure that they do not touch the shaft other than as necessary for torque transfer. Typically, keyways will be provided between the rotor sections and the shaft to transfer torque from the rotor sections to the shaft. As the rotor sections engage the tapered ends of the bearing sleeves, the rotor sections are centralized with respect to the bearing sleeves and thus the axis of rotation.

Referring to FIG. 5, an alternative embodiment is shown. While FIG. 4 discloses a rotor structure suitable for an induction motor (where magnetic fields induce electric currents in the rotor), FIG. 5 discloses a rotor structure that is suitable for a permanent-magnet motor. This embodiment is presented to show that the tapered bearing sleeves can be used in different types of motors (e.g., both induction and permanent-magnet motors designed for downhole use), and is not limited to embodiments comprising induction motors.

As depicted in FIG. 5, the arrangement of bearing sleeve 342 on shaft 230 is the same as in FIG. 4, but the rotor section uses a central tube 510 on which the structure 520 is mounted. Permanent magnet structure 520 can have any suitable structure. As in the other embodiments, there are rotor bearing assemblies at each end of each rotor section. When the ends of central tube 510 are engaged with the tapered ends of the bearing sleeves at each end of the tube, the tube is held in a centralized position in which it is coaxial with bearing sleeve 342. In this position, no part of central tube 510 necessarily touches shaft 230 other than as necessary to transfer torque. Central tube 510 engages the tapered end of bearing sleeve 342 in the same manner as end ring 370. Central tube 510 can likewise be chamfered in the same manner as end ring 370 to engage the tapered end of bearing sleeve 342 with greater contact surface area. Similarly the inner diameter of the rotor laminations in the absence of a tube may be adapted to this purpose.

It should be noted that there may be many alternative embodiments, and the various features of each embodiment may vary somewhat from the embodiments described above. For example, although the rotor bearing assemblies in the alternative embodiments will include bearing sleeves that have tapered ends, the specific structure of the remainder of the rotor bearing assembly may differ from one embodiment to the next. As also noted above, embodiments of the invention may be used in both induction motors and permanent magnet motors. The specific structure of the rotor sections may vary between embodiments, whether the embodiments use induction or permanent-magnet designs.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the embodiments. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the described embodiment.

What is claimed is:

1. A motor comprising:
   a stator having a stator bore therethrough;
   one or more rotor sections positioned within the stator bore, wherein the rotor sections are mounted on a shaft; and
   a plurality of rotor bearing assemblies positioned within the stator bore;
   wherein each rotor bearing assembly includes a bearing that is secured to the stator and a bearing sleeve that is secured to at least one of the rotor sections;
   wherein in each rotor bearing assembly, the corresponding bearing sleeve rotates within the bearing around an axis of rotation and enables the corresponding rotor section to rotate within the stator bore around the axis of rotation;

wherein each end of the bearing sleeve of each rotor bearing assembly has a conically tapered contact surface, wherein the conically tapered contact surface contacts the corresponding rotor section and centers the rotor section with respect to the axis of rotation.

2. The motor of claim 1, wherein the conically tapered contact surfaces of the bearing sleeves face outward from the axis of rotation.

3. The motor of claim 1, wherein each of the rotor sections has a rotor bore therethrough, wherein the rotor sections are mounted on the shaft by positioning the rotor sections with the shaft through the rotor bore, wherein an annular gap is maintained between the rotor sections and the shaft.

4. The motor of claim 1, wherein the bearing assemblies and rotor sections are axially movable with respect to the shaft and the stator bore while maintaining the centered positions of the rotor sections with respect to the axis of rotation.

5. The motor of claim 1, wherein each end of each of the rotor sections has a contact surface that contacts the corresponding bearing sleeve, wherein the contact surface is chamfered so that the contact surface is complementary to the tapered contact surface of the bearing sleeve.

6. The motor of claim 5, wherein each rotor section has a body formed by a lamination stack and an end ring at each end of the lamination stack, wherein the chamfered contact surface at each end of the rotor section is formed on the corresponding end ring.

7. The motor of claim 5, wherein each rotor section has a central tube on which a permanent magnet structure is mounted, wherein the chamfered contact surface at each end of the rotor section is formed on a corresponding end of the central tube.

8. The motor of claim 1, wherein each rotor bearing assembly includes an interference fitting that provides an interference fit between the corresponding bearing and the stator and thereby secures the bearing to the stator.

9. A method for maintaining a position of a rotor section in an electric motor, the method comprising:

providing a stator having a stator bore therethrough, wherein one or more rotor sections are positioned within the stator bore and wherein a shaft is positioned within a rotor bore through the rotor sections;

positioning a plurality of rotor bearing assemblies within the stator bore, wherein each rotor bearing assembly includes a bearing and a bearing sleeve that rotates within the bearing; and for each of the bearing assemblies, securing the bearing to the stator and securing the bearing sleeve to at least one of the rotor sections and to the shaft, wherein each end of the bearing sleeve has a conically tapered contact surface that contacts the corresponding rotor section and centers the rotor section with respect to an axis of rotation of the bearing assembly.

10. The method of claim 9, further comprising the rotor sections and rotor bearing assemblies moving axially with respect to the shaft in response to expansion and contraction of the shaft with respect to the rotor sections and rotor bearing assemblies.

11. The method of claim 9, further comprising maintaining an annular gap between the rotor sections and the shaft.

12. The method of claim 9, wherein securing the bearing to the stator comprises providing an interference fitting between the bearing and the stator, wherein the interference fitting inhibits rotation of the bearing within the stator, but allows the bearing to move axially within the stator.

13. A rotor bearing assembly for a motor, the rotor bearing assembly comprising:

a bearing that is configured to be secured within a bore of a stator; and a bearing sleeve that is configured to be secured to at least one rotor section;

wherein the bearing sleeve has a bore therethrough which accepts a motor shaft;

wherein the bearing sleeve has first and second ends, wherein each of the first and second ends has a conically tapered contact surface, wherein when a rotor section contacts the conically tapered contact surface of the rotor bearing assembly, the conically tapered contact surface centers the rotor section with respect to an axis of rotation of the rotor bearing assembly.

14. The rotor bearing assembly of claim 13, wherein the conically tapered contact surfaces of the bearing sleeves face outward from the axis of rotation.

15. The rotor bearing assembly of claim 13, wherein each rotor bearing assembly includes an interference fitting positioned at an outer diameter of the bearing.

* * * * *